US012273747B1

(12) United States Patent
Ertimo

(10) Patent No.: US 12,273,747 B1
(45) Date of Patent: Apr. 8, 2025

(54) METHOD AND SYSTEM FOR PROVIDING MEASUREMENT-BASED NEW RADIO COVERAGE MAP

(71) Applicant: Elisa Oyj, Helsinki (FI)

(72) Inventor: Riku Ertimo, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/861,377

(22) PCT Filed: May 23, 2023

(86) PCT No.: PCT/FI2023/050286
§ 371 (c)(1),
(2) Date: Oct. 29, 2024

(87) PCT Pub. No.: WO2023/233069
PCT Pub. Date: Dec. 7, 2023

(30) Foreign Application Priority Data

May 30, 2022 (FI) ...................... 20225465

(51) Int. Cl.
*H04W 24/00* (2009.01)
*H04B 17/318* (2015.01)
(Continued)

(52) U.S. Cl.
CPC .......... *H04W 24/02* (2013.01); *H04B 17/328* (2023.05); *H04W 36/0022* (2013.01); *H04W 64/003* (2013.01)

(58) Field of Classification Search
CPC ............. H04W 24/02; H04W 36/0022; H04W 64/003; H04B 17/328
See application file for complete search history.

(56) References Cited

U.S. PATENT DOCUMENTS

| | | | |
|---|---|---|---|
| 2022/0053285 A1 | 2/2022 | Shu et al. | |
| 2022/0167447 A1 | 5/2022 | Liu et al. | |
| 2023/0362725 A1* | 11/2023 | Condoluci | ............ H04W 76/00 |

FOREIGN PATENT DOCUMENTS

| | | |
|---|---|---|
| CN | 111988785 A | 11/2020 |
| CN | 112950243 A | 6/2021 |
| | (Continued) | |

OTHER PUBLICATIONS

European Patent Office, Notification of Transmittal of The International Preliminary Report on Patentability, Application No. PCT/FI2023/050286, Mailed May 22, 2024, 31 pages; includes Applicant's response dated Feb. 20, 2022 to the Written Opinion of the International Examining Authority (WOIPEA) dated Jan. 10, 2024.

(Continued)

*Primary Examiner* — Erika A Washington
(74) *Attorney, Agent, or Firm* — Ziegler IP Law Group, LLC.

(57) ABSTRACT

A method for providing measurement-based new radio (NR) coverage map includes obtaining, from a radio network, a user equipment data; obtaining a first information corresponding to a Long-Term Evolution (LTE) minimization of driving test (MDT); obtaining a second information corresponding to an LTE-NR event; combining the first information and the second information to provide a network performance information; and determining, based on the user equipment data and the network performance information, a location information corresponding to the NR coverage. Disclosed also is a system for providing measurement-based new radio (NR) coverage map.

13 Claims, 4 Drawing Sheets

(51) Int. Cl.
    *H04W 24/02*     (2009.01)
    *H04W 36/00*     (2009.01)
    *H04W 64/00*     (2009.01)

(56) References Cited

FOREIGN PATENT DOCUMENTS

| | | |
|---|---|---|
| CN | 113015192 A | 6/2021 |
| CN | 114422955 A | 4/2022 |
| WO | 2020167206 A1 | 8/2020 |

OTHER PUBLICATIONS

European Patent Office, Written Opinion of The International Preliminary Examining Authority, Application No. PCT/FI2023/050286, Mailed Jan. 10, 2024, 4 pages.
European Patent Office, Written Opinion of The International Searching Authority and International Search Report, Application No. PCT/FI2023/050286, Mailed Aug. 24, 2023, 15 pages.
Finnish Patent and Registration Office, Search Report, Application No. 20225465, Mailed Jan. 25, 2023, 2 pages.

\* cited by examiner

METHOD AND SYSTEM FOR PROVIDING MEASUREMENT-BASED NEW RADIO COVERAGE MAP

TECHNICAL FIELD

The present disclosure relates to method for providing measurement-based new radio (NR) coverage map. The present disclosure also relates to system for providing measurement-based new radio (NR) coverage map.

BACKGROUND

In recent past, 2G, 3G and 4G cellular wireless technologies have been mass deployed throughout the world. Moreover, personal area network-based technologies such as Wi-Fi®, Bluetooth®, and ZigBee® have become predominant amongst the mass population. With the advancement in cellular wireless technologies, the mobile network operators (MNO) have started deploying 5G cellular networks in mid-frequency bands (i.e., 3-6 GHZ) with existing 4G cellular networks. Typically, the 5G cellular networks may be used to designate fifth generation of mobile technologies and allow users to use mobile phone with a larger bandwidth. However, as one moves to a higher frequency band, the free space propagation loss increases significantly, thereby limiting the individual cell site radius to 100 m for the higher frequency band compared to several kilometers for the 4G. Additionally, the MNOs may need to deploy hundreds of new small cells (e.g., 100 m cell radius) compared to one large cell site (e.g., a macrocell or macrosite with several km cell radius) to ensure 100% network coverage for the same area. However, there exists a bigger challenge for the MNOs to accurately plan and acquire these massive number of new cell site locations to provide uniform 5G coverage.

Conventionally, to measure the maximum available performance of the network, certain values, such as Reference Signal Received Power (RSRP) levels, Reference Signal Received Quality (RSRQ) levels, Signal-to-Interference-plus-Noise Ratio (SINR), and the resulting coverage, are fundamental measures of the maximum available performance of the mobile networks. In this regard, the coverage is typically estimated/measured by using predictions in the planning tool and by using the drive test. However, such methods of prediction in the planning tool comprises of various predictions that are designed by various mathematical models that have a number of uncertainties. Moreover, the drive test method only covers the coverage of certain routes and locations, such as the areas near roads and highways, and covers the coverage of network in areas, such as shopping malls, hospitals, and the like, which makes the said method more expensive.

In patent applications CN113015192A (China Mobile Communications Corp Chaanxi Co LtD et al.; "Method, device, equipment and storage medium for determining antenna weight") there are techniques for determining antenna weights to optimize coverage within an existing 5G network. It involves acquiring 4G MDT data and 5G measurement reports (MR) from multiple user equipment accessing the target 5G cell, along with the antenna file corresponding to the target antenna.

Patent application US20220053285A1 (Shu Di et al.; "Positioning in wireless communication networks") describes a method for assisting in position determination in a wireless communication system, where the method comprises obtaining pairs of radio frequency environment data sets for each of the common positions and a pair of transformation operator is created based in the pairs of radio frequencies, and the transformation operator represents a relation between radio frequency environment data sets of the first and second access technology.

In patent application CN114422955A (Beijing Dongtuming Science and Tech Co Ltd; "5G positioning method and device, equipment and storage medium for indoor weak coverage area") there are techniques for positioning a 5G indoor weak coverage area by screening 4G cells with 5G high backflow according to the daily average total flow of the 4G cells in the current area and the daily average 4G flow of 5G users, screening out 5G cells covered by 4G according to the coverage area of the 4G cell with the 5G high backflow and the positions of the 5G macro stations nearby, acquiring the position of a sampling point reported by a 5G user in a 4G cell in the 4G co-coverage 5G cell in service state measurement, and positioning the 5G indoor weak coverage area according to the position of the sampling point and the indoor plane longitude and latitude data of the building.

Thus, the conventional techniques do not provide good connectivity between a network and user devices resulting in an unreliable network connectivity. Further, due to poor and unreliable connectivity, the conventional techniques have low data transfer speeds. Therefore, with the conventional techniques there exists a bigger challenge of providing an improved generation of NR coverage maps with better connectivity and faster data transfer speeds for users.

Therefore, considering the foregoing discussion, there exists a need to overcome the aforementioned drawbacks associated with conventional methods of network coverage.

SUMMARY

The present disclosure seeks to provide a method for providing measurement-based new radio (NR) coverage map. The present disclosure also seeks to provide a system for providing measurement-based new radio (NR) coverage map. An aim of the present disclosure is to provide a solution that overcomes at least partially the problems encountered in prior art.

In one aspect, an embodiment of the present disclosure provides a method for providing measurement-based new radio (NR) coverage map, the method comprising:
- obtaining, from a radio network, a user equipment data;
- obtaining a first information corresponding to a Long-Term Evolution, LTE, minimization of driving test, MDT;
- obtaining a second information corresponding to a Long-Term Evolution and New Radio, LTE-NR, event;
- combining the first information and the second information; and
- determining, based on the user equipment data and the combined first information and second information, a location information corresponding to the NR coverage, wherein the determining the location information comprises determining the exact location of cells associated with the user equipment.

Thus, the present disclosure provides a specific technique for generating the NR coverage map by combining LTE-MDT and LTE-NR event information to determine NR coverage. As a result, there is no need to use LTE and 5G data separately. Further, the present disclosure provides a unique approach by leveraging existing network data to create a more accurate and comprehensive coverage map, thus improving network planning and optimization.

Further, the present disclosure provides a more comprehensive view of the network performance by identifying areas of low coverage, interference, or other network issues that need to be addressed. As a result, the present disclosure provides an efficient and effective network planning and optimization and improves the overall user experience and satisfaction.

In another aspect, an embodiment of the present disclosure provides a system for providing measurement-based new radio (NR) coverage map, the system comprising a processor, and a memory including a computer-executable program code, the memory and the computer-executable program code configured to, with the processor, cause the system to:
- obtain, from a radio network, a user equipment data;
- obtain a first information corresponding to a Long-Term Evolution, LTE, minimization of driving test, MDT;
- obtain a second information corresponding to a Long-Term Evolution and New Radio, LTE-NR, event;
- combine the first information and the second information; and
- determine, based on the user equipment data and the combined first information and second information, a location information corresponding to the NR coverage, wherein the determining the location information comprises determining the exact location of cells associated with the user equipment.

In yet another aspect, an embodiment of the present disclosure provides a computer program product comprising a non-transitory machine-readable data storage medium having stored thereon computer-executable program code that, when executed by a processor, cause the system to carry out the aforementioned method.

Embodiments of the present disclosure substantially eliminate or at least partially address the aforementioned problems in the prior art and provides an improved method and an efficient system for providing measurement-based new radio (NR) coverage map. Beneficially, the method may reduce the number of drive tests and/or prediction data, thereby enabling the effective analysis for providing better measurement-based new radio (NR) coverage map in a particular area useful for operators, vendors, and telecommunication companies. Additionally, the disclosed method is cost-efficient as compared to conventional methods.

Embodiments of the present disclosure results in improvement in the generation of NR coverage map by optimizing network performance and also improving the overall efficiency of wireless network operations. As a result, the present disclosure provides better connectivity and faster data transfer speeds for users, as well as improved network reliability and reduced downtime.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, elements have been indicated by identical numbers.

Embodiments of the present disclosure will now be described, by way of example only, with reference to the following diagrams wherein.

Figure 1:
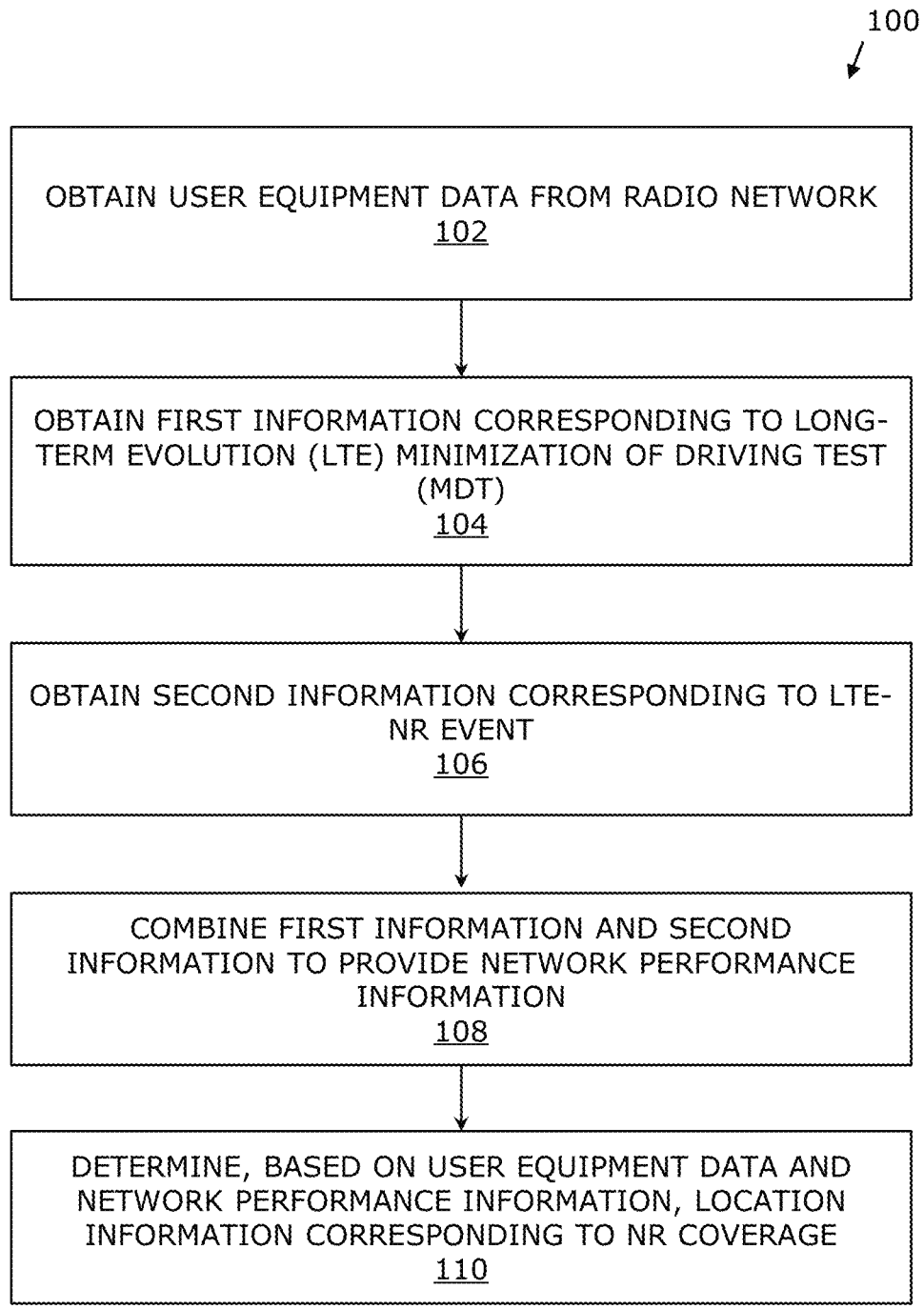
FIG. 1 is a flowchart depicting the steps of a method for providing measurement-based new radio (NR) coverage map, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for providing measurement-based new radio, NR, coverage map, the method comprising:
- obtaining, from a radio network, a user equipment data;
- obtaining a first information corresponding to a Long-Term Evolution, LTE, minimization of driving test, MDT;
- obtaining a second information corresponding to a Long-Term Evolution and New Radio, LTE-NR, event;
- combining the first information and the second information; and
- determining, based on the user equipment data and the combined first information and second information, a location information corresponding to the NR coverage, wherein the determining the location information comprises determining the exact location of cells associated with the user equipment.

Thus, the present disclosure provides a specific technique for generating the NR coverage map by combining LTE-MDT and LTE-NR event information to determine NR coverage. As a result, there is no need to use LTE and 5G data separately. Further, the present disclosure provides an unique approach by leveraging an existing network data to create a more accurate and comprehensive coverage map, thus improving network planning and optimization.

Further, the present disclosure provides a more comprehensive view of the network performance by identifying areas of low coverage, interference, or other network issues that need to be addressed. As a result, the present disclosure provides an efficient and effective network planning and optimization and improves the overall user experience and satisfaction.

In another aspect, an embodiment of the present disclosure provides a system for providing measurement-based new radio, NR, coverage map, the system comprising a processor, and a memory including a computer-executable program code, the memory and the computer-executable program code configured to, with the processor, cause the system to:

- obtain, from a radio network, a user equipment data;
- obtain a first information corresponding to a Long-Term Evolution, LTE, minimization of driving test, MDT;
- obtain a second information corresponding to a Long-Term Evolution and New Radio, LTE-NR, event;
- combine the first information and the second information; and
- determine, based on the user equipment data and the combined first information and second information, a location information corresponding to the NR coverage, wherein the determining the location information comprises determining the exact location of cells associated with the user equipment.

In yet another aspect, an embodiment of the present disclosure provides a computer program product comprising a non-transitory machine-readable data storage medium having stored thereon computer-executable program code that, when executed by a processor, causes the system to carry out the aforementioned method.

The present disclosure provides the aforementioned method that employs a combination of actions, namely, Long-Term Evolution (LTE) minimization of driving test (MDT) and an (LTE-NR) Long-Term Evolution—New Radio event, for measurement-based new radio (NR) coverage map. In this regard, the method comprises obtaining, from a radio network, a user equipment data in order to achieve a detailed coverage analysis so that areas for capacity upgrades may be identified faster. Moreover, the method comprises obtaining a first information corresponding to a Long-Term Evolution (LTE) minimization of driving test (MDT) in order to reduce the number of drive tests or prediction data, thereby enabling the effective analysis using the first information, as well as providing accurate representation thereof to a real end user coverage. Advantageously, issues related even to specific users may be tracked, and detailed solutions and troubleshooting may be provided using the aforementioned method and the aforementioned system. Moreover, the disclosed method provides a cost-efficient, accurate, and fast performance of the system as compared to conventional systems.

The term "Long-Term Evolution (LTE) minimization of driving test (MDT)" as used herein stands for LTE networks that collect and analyzes network performance data without physical drive tests. It uses data logging in mobile devices to measure signal strength, quality, and other parameters, enabling network optimization and troubleshooting. Further, the term "(LTE-NR) Long-Term Evolution-New Radio" as used herein stands for Long-Term Evolution-New Radio and refers to the combination of LTE (Long-Term Evolution) and NR (New Radio) technologies. It represents the integration of 4G LTE and 5G NR technologies to provide enhanced network capabilities and improved performance, enabling seamless connectivity and higher data rates for mobile communication. Also, the term "New Radio" as used herein stands for 5G wireless standard that offers faster speeds, lower latency, increased capacity and supports advanced features like beamforming and network slicing.

The method comprises obtaining, from the radio network, the user equipment data. The term "radio network" as used herein refers to a network arrangement or a part of a mobile telecommunications system that is used to connect several individual devices to other parts of the network arrangement using radio access technology (RAT). In this regard, the radio network may reside between a user equipment and enable a connection with a core network thereof. The term "user equipment" as used herein refers to a device that is used by an end-user to communicate. Optionally, the user equipment is at least one of: a communication device, a tele-communication device, a network device, or a computing device. In an example, the user equipment may be a hand-held telephone, a mobile phone, a laptop or a computer equipped with a mobile broadband adapter, any remotely controlled machine, and so forth. In other words, the user equipment may be used for initiating a number of calls. Optionally, the user equipment may be a terminal device that comprises a subscriber identity module (SIM) card. Beneficially, the user equipment may handle certain tasks such as mobility management, call control, session management identity management, and so forth. Moreover, the user equipment is associated with the user equipment data that is obtained from the radio network.

Moreover, the method comprises obtaining a first information corresponding to a Long-Term Evolution (LTE) minimization of driving test (MDT) and a second information corresponding to an Long-Term Evolution-New Radio (LTE-NR) event. The terms "first information" and "second information" as used herein refer to a data collected from the user equipment. Typically, the first information i.e., Long-Term Evolution (LTE) minimization of driving test (MDT) may be collected from the location information and new radio power levels associated with a particular call information document or trace information document. Optionally, the first information comprises at least one of: a report time, a source cell identity, a final timing advance, and the location information. The first information provides the related reports such as data collection time, latitude and longitude information associated with the different user equipment providing the corresponding user equipment data, and the source cell identity that provides a unique number used to identify each base transceiver station (BTS). In this regard, the first information provides the information related to the geographical coordinate associated with the call ID or trace ID of the user equipment. The term "final timing advance" as used herein refers to provide the value corresponding to the length of time a signal takes to reach the base station from the user equipment. Moreover, in addition to location information, i.e. coordinates from the LTE side and measured NR power level, information corresponding to the call ID or trace ID also constitute the first information. It will be appreciated that the location information (namely, coordinate information) and power information are from the same call. Therefore, both the location information and the power information can be associated as those are in time domain close to each other. Beneficially, obtaining the first information provides better mapping of the network coverage in the corresponding area associated therewith. Advantageously, MDT may be a standardized mechanism to provide operators with network performance optimization tools in a cost-efficient manner.

Moreover, the second information may be collected from different locations, and may constitute information such as the quality information of the signals of the particular user equipment such as RSRP, RSRQ and SINR values. The terms "reference signal received power" (RSRP) and "reference signal received quality" (RSRQ) as used herein refer to key measures of signal level and quality for modern LTE networks. In an example, in cellular networks, when a user equipment moves from one cell to another cell and performs cell selection/reselection and handover, the user equipment may measure the signal strength or quality of the neighbouring cells. Moreover, during the procedure of handover, the LTE specification may provide flexibility of using RSRP, RSRQ, or both. The term "signal-to-interference-plus-noise ratio" (SINR) as used herein refers to a quantity used to give theoretical upper bounds on channel capacity or the rate of information transfer in wireless communication systems such as networks, and is defined as the power of a certain signal of interest divided by the sum of the interference power (from all the other interfering signals) and the power of some background noise.

Optionally, the second information comprises at least one of: at least one reference signal received power, RSRP, measurement report source, at least one RSRP measurement report target, at least one Physical Cell ID, PCI, measurement report target, at least one target measurement down link, DL, E-UTRA Absolute Radio Frequency Channel Number, EARFCN. Herein, the at least one reference signal received power (RSRP) measurement report source provides power information to the BTS that is configured to receive, store and process the power information for generating a real-time status of the NR coverage map. Moreover, the at least one RSRP measurement report target and the at least one Physical Cell ID (PCI) measurement report target provide power information corresponding to the user equipment. Notably, each 5G NR cell corresponds to a Physical Cell ID (PCI) that is used to distinguish cells on the radio side. The PCI planning for 5G NR is similar to PCI planning for LTE and scrambling code planning for 3G UMTS. It will be appreciated that a bad or wrong planning can affect the synchronization procedure, demodulation, and handover signalling and degrade the network performance. Therefore, the PCI planning should be simpler for NR compared to LTE as there are double as many PCIs available for allocation. In an example, in a 5G NR, there may be 1008 unique PCIs compare to 504 PCIs in LTE. Furthermore, the at least one target measurement down link (DL) E-UTRA Absolute Radio Frequency Channel Number (EARFCN) are frequency bands of carrier signals (ranging between 0 and 700000 Hz) defined by a regulatory authority, herein EARFCN.

Optionally, the LTE-NR event may be a B1 event, a B2 event, and so forth. The LTE-NR B1 and B2 events are inter-radio access technology (RAT) events that provide the LTE RSRP, LTE RSRQ and LTE SINR parameters values in a particular range corresponding to the associated user equipment. Moreover, these events may be used to trigger inter-RAT mobility procedures when the primary serving cell becomes weak, whereas, the inter-system neighbour cell measurements are used to ensure that the target cell provides adequate coverage.

Furthermore, the method comprises combining the first information and the second information to provide a network performance information. The combined data provide a better mapping of the network coverage in the corresponding area associated with the different user equipment. Notably, the combining of the first information and the second information occurs at the BTS.

Furthermore, the method comprises determining, based on the user equipment data and the network performance information, a location information corresponding to the NR coverage. In this regard, each user equipment data and the network performance information are combined and processed to determine the exact location of the cell associated with the user equipment. This determination/processing to determine can be done for example using triangulation type of approach, network simulations, using signal strength values or for example data speeds.

Optionally, a time stamp is associated with each of the user equipment data, the first information, and the second information. The term "time stamp" as used herein refers to a current time of occurrence of an event that a computer records through mechanisms, such as the Network Time Protocol, wherein a computer maintains an accurate time, calibrated to minute fractions of a second, associated with an event. Furthermore, the said precision enables networked computers and applications to communicate effectively. Optionally, the user equipment may be provided with a time-stamping module to record the date and time of an event.

Optionally, the method further comprises correlating the first information and the second information based on at least one of: the source cell identity and a time stamp associated therewith. The term "source cell identity" as used herein refers to a unique number used to identify each base transceiver station (BTS) or sector of a BTS within a location area code (LAC) if not within a Global System for Mobile communication (GSM) network. Beneficially, the LTE-MDT and NR event information using the cell ID and the time information (such as GPS coordinates and NR target information) are correlated to provide an improved network performance.

Optionally, the method further comprises performing cell recognition for a NR cell based on the second information that is unique to the NR cell. The second information corresponding to the LTE-NR event such as physical cell ID (unique to each NR cell) and the frequency information helps in performing the recognition of a cell from the different locations.

In an example, the first information and second information based on the Long-Term Evolution (LTE) minimization of driving test (MDT) module and an LTE-NR event module, respectively, provides the source LTE cell information (such as report time, SRB source cell ID, final timing advance, latitude, longitude, altitude and RSRP measurement report for various source LTE cells) and target NR cell information (such as PCI measurement report of various target NR cells, RSRP measurement report of various target NR cells and target cell measurement DL EARFCN).

Optionally, the method further comprises performing geo-tiling on the measurement-based NR coverage map. The term "geo-tiling" as used herein refers to a map service obtained from a geosynchronous (or geostationary) earth orbiting satellite system for telecommunications. Moreover, the satellites that are in the line-of-sight contact with the vast number of base transceiver stations (BTS) in the geostationary earth orbit configured to provide real-time full global transmission of the first information and the second information associated with the different user equipment to the BTS for the better mapping of the network coverage in the corresponding area. It will be appreciated that a plurality of neighbouring cells in a geographic area provide better geo-tiling coverage of the network on the measurement-based NR coverage map.

The present disclosure also relates to the computer program product as described above. Various embodiments and variants disclosed above apply mutatis mutandis to the computer program product.

Optionally, the computer program product is implemented as an algorithm, embedded in a software stored in the non-transitory machine-readable data storage medium. The non-transitory machine-readable data storage medium may include, but is not limited to, an electronic storage device, a magnetic storage device, an optical storage device, an electromagnetic storage device, a semiconductor storage device, or any suitable combination of the foregoing. Examples of implementation of the computer-readable medium include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

The present disclosure also relates to the system as described above. Various embodiments and variants disclosed above apply mutatis mutandis to the system.

In this regard, the system comprises the processor communicably coupled to the memory including the computer-executable program code via a communication interface. The term "processor" as used herein refers to an application, program, process or device that responds to requests for information or services by another application, program, process or device (such as the external device) via a network interface. Optionally, the processor also encompasses software and the memory including the computer-executable program code that makes the act of serving information or providing services possible. It may be evident that the communication means of an external device may be compatible with a communication means of the processor, in order to facilitate communication therebetween.

Optionally, the system further comprises:
  a user equipment configured to transmit the user equipment data to the radio network;
  a Long-Term Evolution, LTE, minimization of driving test, MDT, module configured to provide the first information; and
  an LTE-NR event module configured to provide the second information.

Herein, the LTE MDT module and the LTE-NR event module are configured to communicate with the user equipment to collect data from the user equipment.

Optionally, the system further comprises a global positioning system to obtain a location information from the LTE MDT module. In this regard, the global positioning system (GPS) is the satellite-based radio navigation system configured to obtain location information from the LTE MDT module. Optionally, the GPS provides real-time geographic locations corresponding to the NR network. Optionally, the navigation system can also use BeiDou Navigation Satellite System (BDS), Global Navigation Satellite System (GLONASS), Galileo, Indian Regional Navigation Satellite System (IRNSS)/Navigation Indian Constellation (NavIC), Quasi-Zenith Satellite System (QZSS).

Optionally, the LTE-NR event module is configured to perform an inter-radio access technology, RAT, handover procedure, wherein the inter-RAT handover procedure is independent of a coverage of serving LTE cells. The "inter-RAT" enables devices to smoothly transition and utilize different wireless communication technologies or access networks, ensuring uninterrupted connectivity and optimal network performance. The inter-RAT handover procedure occurs when a mobile terminal, while connected using a RAT, performs measurements from the serving LTE cells as well as neighbouring cell, and sends measurement report to the network. Based on this measurement report provided by the mobile terminal, the network can initiate handover from one RAT to another, e.g., from WCDMA to GSM or vice versa. Once the handover with the new RAT is completed, the channels used by the previous RAT are released. RAT may be either GSM, CDMA, WIMAX, LTE, TD-SCDMA or any other wireless technology used to provide air interface to user equipment to obtain various services (such as voice, email, internet, VOIP).

Detailed Description of the Drawings

Referring to FIG. 1, there is shown a flowchart 100 illustrating steps of a method for providing measurement-based new radio (NR) coverage map, in accordance with an embodiment of the present disclosure. At step 102, a user equipment data is obtained from a radio network. At step 104, a first information corresponding to a Long-Term Evolution (LTE) minimization of driving test (MDT) is obtained. At step 106, a second information corresponding to an LTE-NR event is obtained. At step 108, the first information and the second information are combined to provide a network performance information. At step 110, a location information corresponding to the NR coverage is determined based on the user equipment data and the network performance information.

The steps 102, 104, 106, 108, and 110 are only illustrative and other alternatives can also be provided where one or more steps are added, one or more steps are removed, or one or more steps are provided in a different sequence without departing from the scope of the claims herein.

Figure 2:
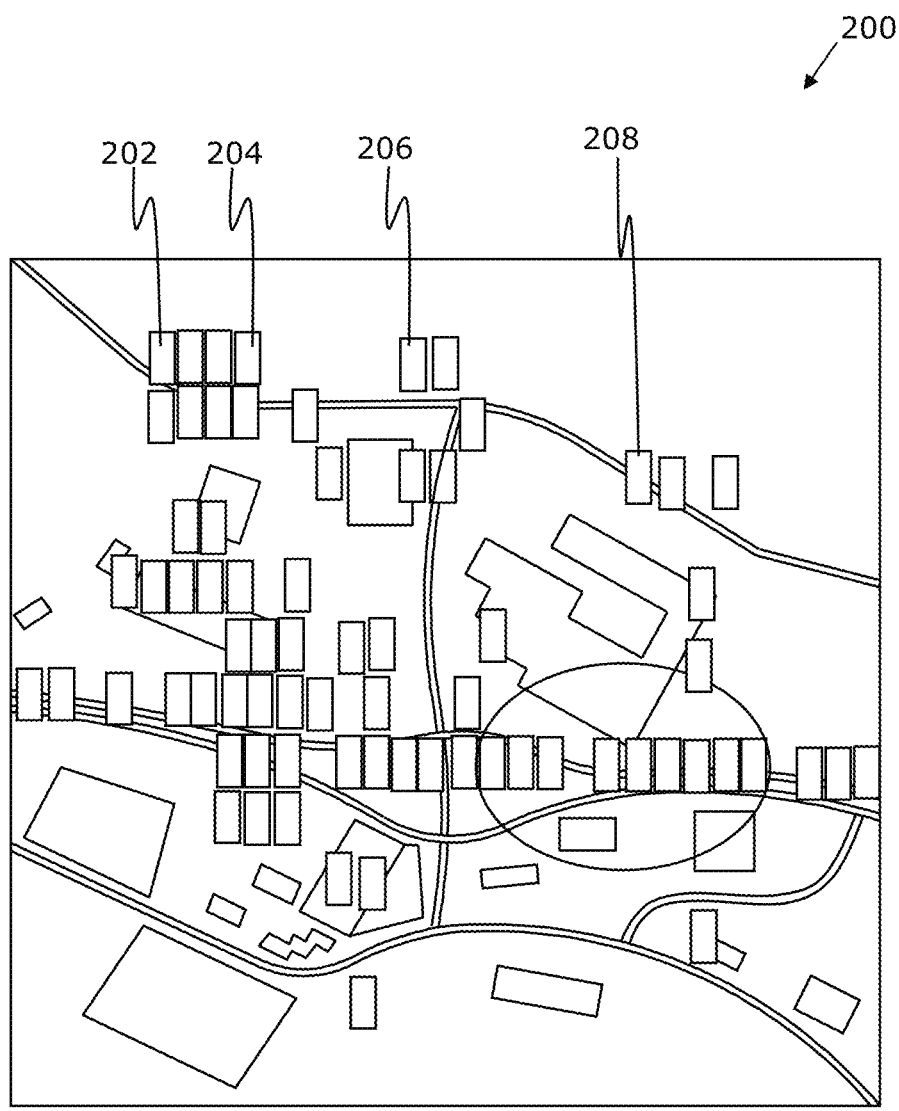
FIG. 2 is a schematic illustration of geo binning on a measurement-based NR coverage map, in accordance with an embodiment of the present disclosure.

Referring to FIG. 2, shown is a schematic illustration of geo binning on a measurement-based NR coverage map 200, in accordance with an embodiment of the present disclosure. As shown the measurement-based NR coverage map 200 comprises different tiles such as 202, 204, 206, and 208 of 100×100 m (or well 100×50 m). Moreover, the different tiles 202, 204, 206, and 208 on the measurement-based NR coverage map 200 depicts the RSRP power levels to measure the signal strength/quality. Furthermore, the tiles 202 shows the RSRP level (>=−90 dBm) describes the excellent signal strength and provides the strong signal with maximum data speeds. Furthermore, the tiles 204 shows the RSRP level (<−90 dBm) describes the good signal strength and provides strong signal with good data speeds. Additionally, the tiles 206 shows the RSRP level (<−100 dBm) describes the fair to poor signal strength and provides the reliable data speeds with possibilities of marginal data with dropouts, and when this value gets close to −100, performance drops drastically. Furthermore, the tiles 208 shows the RSRP level (<−110 dBm) describes the zero or negligible signal strength and provides the disconnection from the network.

Figure 3A:
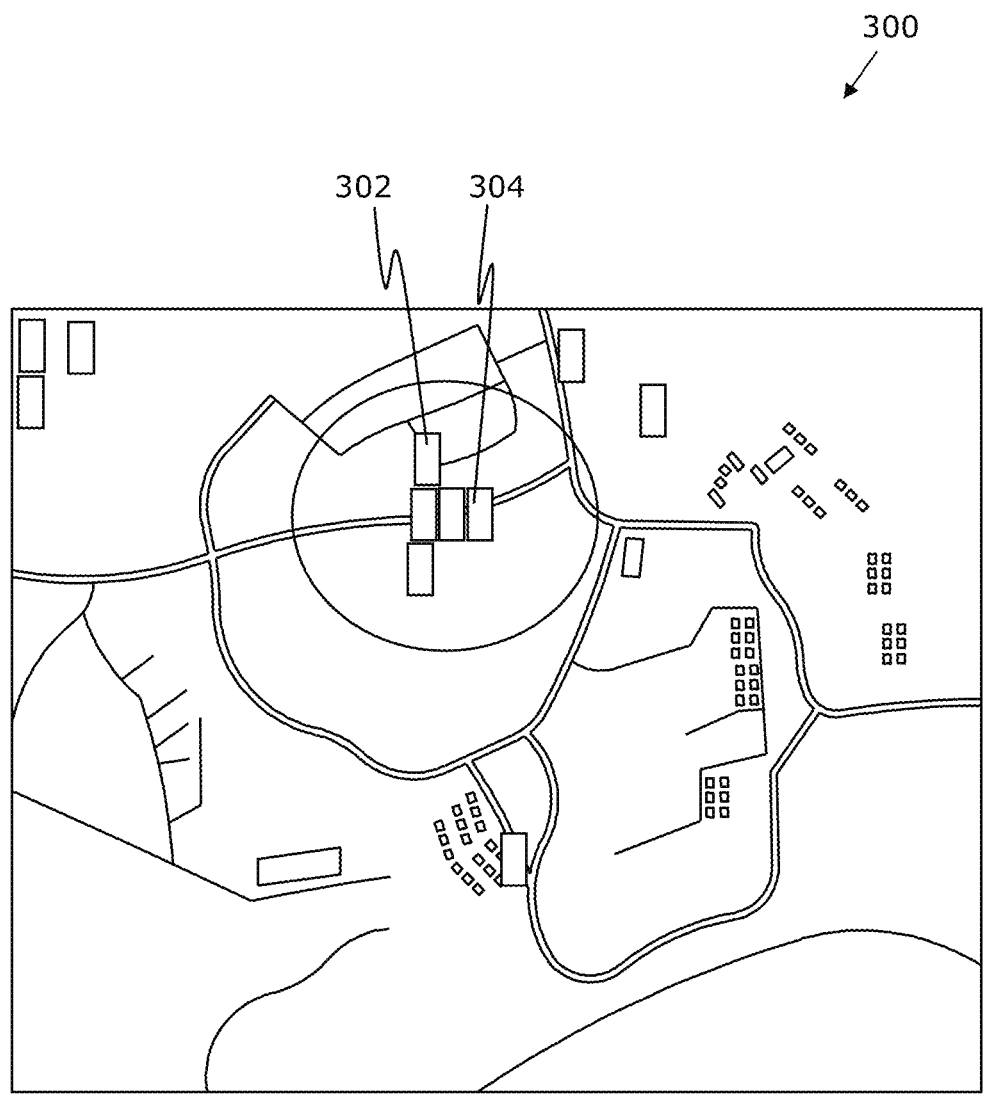
FIGS. 3A and 3B are schematic illustrations of bad coverage of the network on a map, in accordance with an embodiment of the present disclosure.
Figure 3B:
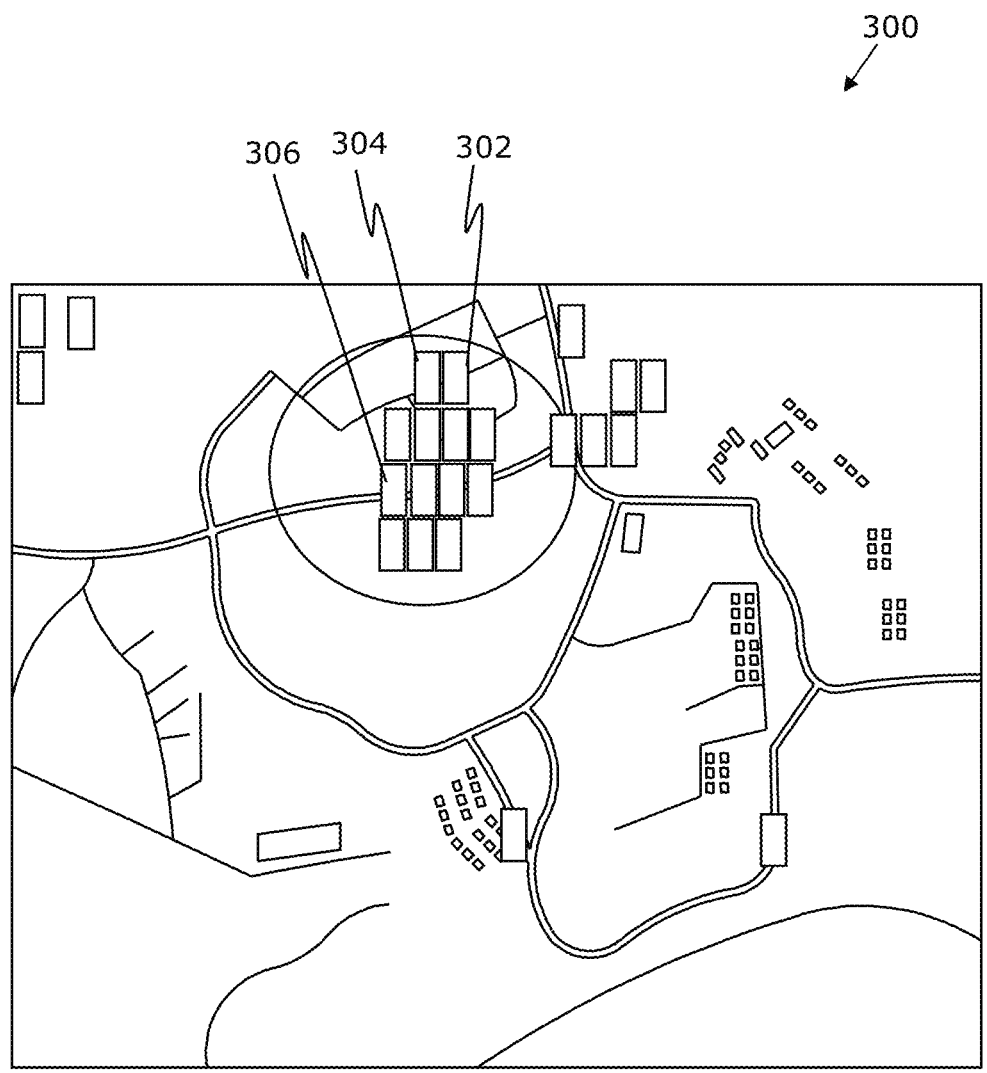

Referring to FIGS. 3A and 3B, are schematic illustrations of bad coverage of network on a map 300, in accordance with an embodiment of the present disclosure. As shown in the FIG. 3A, the different tiles 302, and 304 depicts the bad coverage of network (for RSRP level <−100 dBm and <−110 dBm) in the particular area for the NR3500 frequency coverage. As shown in the FIG. 2B shows the new NR site combining both the NR700 and NR3500 frequency coverage, having different tiles 302, 304, and 306 depicts the bad coverage of network (for RSRP level <−100 dBm, <−110 dBm and <−90 dBm) more clearly in the particular area.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for providing measurement-based new radio, NR, coverage map, the method comprising:
   obtaining, from a radio network, a user equipment data;
   obtaining a first information corresponding to a Long-Term Evolution, LTE, minimization of driving test, MDT;
   obtaining a second information corresponding to a Long-Term Evolution and New Radio, LTE-NR, event;
   combining the first information and the second information; and
   determining, based on the user equipment data and the combined first information and second information, a location information corresponding to the NR coverage, wherein the determining location information comprises determining the exact location of cells associated with the user equipment.

2. The method according to claim 1, wherein a time stamp is associated with each of the user equipment data, the first information, and the second information.

3. The method according to claim 1, wherein the first information comprises at least one of: a report time, a source cell identity, a final timing advance, and the location information.

4. The method according to claim 1, wherein the second information comprises at least one of: at least one reference signal received power, RSRP, measurement report source, at least one RSRP measurement report target, at least one Physical Cell ID, PCI, measurement report target, at least one target measurement down link, DL, E-UTRA Absolute Radio Frequency Channel Number, EARFCN.

5. The method according to claim 1, further comprising correlating the first information and the second information based on at least one of: the source cell identity and a time stamp associated therewith.

6. The method according to claim 1, further comprising performing geo-tiling on the measurement-based NR coverage map.

7. The method according to claim 1, further comprising performing cell recognition for a NR cell based on the second information that is unique to the NR cell.

8. The method according to claim 1, wherein the user equipment is at least one of: a communication device, a tele-communication device, a network device, a computing device.

9. A computer program product comprising a non-transitory machine-readable data storage medium having stored thereon computer-executable program code that, when executed by a processor, cause the system to carry out the method of claim 1.

10. A system for providing measurement-based new radio, NR, coverage map, the system comprising a processor, and a memory including a computer-executable program code, the memory and the computer-executable program code configured to, with the processor, cause the system to:
    obtain, from a radio network, a user equipment data;
    obtain a first information corresponding to a Long-Term Evolution, LTE, minimization of driving test, MDT;
    obtain a second information corresponding to a Long-Term Evolution and New Radio, LTE-NR, event;
    combine the first information and the second information; and
    determine, based on the user equipment data and the combined first information and second information, a location information corresponding to the NR coverage, wherein the determining location information comprises determining the exact location of cells associated with the user equipment.

11. The system according to claim 10, further comprising:
    a user equipment configured to transmit the user equipment data to the radio network;
    a Long-Term Evolution, LTE, minimization of driving test, MDT, module configured to provide the first information; and
    an LTE-NR event module configured to provide the second information.

12. The system according to claim 10, further comprising a global positioning system to obtain a location information from LTE MDT module.

13. The system according to claim 10, wherein the LTE-NR event module is configured to perform an inter-radio access technology, RAT, handover procedure, wherein the inter-RAT handover procedure is independent of a coverage of serving LTE cells.

* * * * *